(12) United States Patent
Mazenc et al.

(10) Patent No.: US 10,428,752 B2
(45) Date of Patent: Oct. 1, 2019

(54) METHOD FOR DETERMINING THE ANGULAR POSITION OF AN ENGINE

(71) Applicants: Continental Automotive France, Toulouse (FR); Continental Automotive GmbH, Hannover (DE)

(72) Inventors: Christophe Mazenc, Toulouse (FR); Pierre Zouboff, Colomiers (FR)

(73) Assignees: Continental Automotive France, Toulouse (FR); Continental Automotive GmbH, Hannover (DE)

(*) Notice: Subject to any disclaimer, the term of this patent is extended or adjusted under 35 U.S.C. 154(b) by 0 days.

(21) Appl. No.: 15/778,441

(22) PCT Filed: Nov. 18, 2016

(86) PCT No.: PCT/EP2016/001934
§ 371 (c)(1),
(2) Date: May 23, 2018

(87) PCT Pub. No.: WO2017/088971
PCT Pub. Date: Jun. 1, 2017

(65) Prior Publication Data
US 2018/0347483 A1    Dec. 6, 2018

(30) Foreign Application Priority Data
Nov. 26, 2015  (FR) ...................... 15 61399

(51) Int. Cl.
*F02D 41/00* (2006.01)
*F02D 41/22* (2006.01)
*G01D 5/245* (2006.01)

(52) U.S. Cl.
CPC ......... *F02D 41/009* (2013.01); *F02D 41/222* (2013.01); *G01D 5/2457* (2013.01); *F02D 2250/06* (2013.01); *Y02T 10/40* (2013.01)

(58) Field of Classification Search
CPC .. F02D 41/009; F02D 41/222; F02D 2250/06; G01D 5/2457; Y02T 10/40
See application file for complete search history.

(56) References Cited

U.S. PATENT DOCUMENTS 10,240,550 B2 *  3/2019  Mazenc .................. F02D 41/22
2014/0060486 A1    3/2014  Maezawa

FOREIGN PATENT DOCUMENTS

DE  102013216731 A1  3/2014
DE  102013216122 A1  2/2015
(Continued)

OTHER PUBLICATIONS

International Search Report and Written Opinion for International Application No. PCT/EP2016/001934, dated Feb. 17, 2017, 7 pages.
(Continued)

*Primary Examiner* — Xiao En Mo
(74) *Attorney, Agent, or Firm* — RatnerPrestia

(57) ABSTRACT

A method for determining the angular position of an engine by a crankshaft sensor, having the following steps: production by the crankshaft sensor of a signal exhibiting a "revolution" event, determination of the revolution out of two revolutions, since a crankshaft makes two revolutions per engine cycle for a four-stroke engine, for each "no tooth" event potentially produced, a change in the direction of rotation of the engine is suspected, and an analysis step is performed which comprises: if, during an inverse window, a further "no tooth" event is produced, the change in direction of rotation is confirmed.

9 Claims, 2 Drawing Sheets

(56) References Cited

FOREIGN PATENT DOCUMENTS

| | | |
|---|---|---|
| EP | 1541846 A1 | 6/2005 |
| FR | 3042860 A1 | 4/2017 |
| JP | 2008286091 A | 11/2008 |

OTHER PUBLICATIONS

English translation of the Written Opinion for International Application No. PCT/EP2016/001934, dated Feb. 17, 2017, 6 pages.

* cited by examiner

METHOD FOR DETERMINING THE ANGULAR POSITION OF AN ENGINE

CROSS REFERENCE TO RELATED APPLICATIONS

This application is the U.S. National Phase application of PCT International Application No. PCT/EP2016/001934, filed Nov. 18, 2016, which claims priority to French Patent Application No. FR 1561399, filed Nov. 26, 2015, the contents of such applications being incorporated by reference herein.

FIELD OF THE INVENTION

The present invention relates to a method for synchronizing an engine. The synchronization of an engine is the operation which consists in determining the angular position of an engine. This determination is essential in order to be able then to control the engine and carry out, for example, the fuel injection at the right moment in the engine cycle.

BACKGROUND OF THE INVENTION

To this end, an engine, such as an internal combustion engine, includes a crankshaft sensor and at least one camshaft sensor.

A crankshaft sensor comprises a crankshaft toothed wheel, joined to the crankshaft so as to rotate therewith and comprising a large number of regular teeth and a revolution marker. The crankshaft sensor additionally comprises a crankshaft detector facing said crankshaft toothed wheel and able to detect a presence/absence of material and thus to detect a tooth or a slot (absence of tooth).

The crankshaft toothed wheel is angularly divided equally into a large number of regular teeth, thus making it possible to accurately ascertain the angular position of the crankshaft. The crankshaft toothed wheel additionally comprises a revolution marker allowing an absolute marking of a given angular position, once per revolution. Said revolution marker is generally associated with a particular position of the engine, such as conventionally the top dead center of the first cylinder. Thus, the knowledge of the angular position of the revolution marker indicates precisely the angular position of the engine.

It should be noted that a crankshaft performs two revolutions per cycle of the engine. This results in the angular position of the engine being afflicted by an uncertainty of one revolution out of two.

This uncertainty can be lifted, typically, by using a camshaft sensor, very similar to the crankshaft sensor, but arranged on a camshaft which advantageously performs one revolution per cycle of the engine.

Such a synchronization method may, in a prejudicial manner, be deceived if the engine changes direction of rotation and rotates oppositely. If an engine is considered to be synchronized, whereas it rotates oppositely, a fuel injection can be commanded and can lead to damaging effects for the engine.

SUMMARY OF THE INVENTION

Thus, an aspect of the invention proposes a method of synchronizing an engine able to detect a rotation in the inverse direction and to prevent a synchronization in this case. Hence, as long as the synchronization is not considered to be carried out, no damaging action will be carried out.

The subject of an aspect of the invention is a method for determining the angular position of an engine by means of a crankshaft sensor comprising a crankshaft detector facing a crankshaft toothed wheel comprising a large number of regular teeth and a revolution marker, the crankshaft detector being able to produce a signal having a "tooth" event corresponding to an edge for each of said teeth, a "revolution" event for the revolution marker, and a "no tooth" event when two successive "tooth" events are abnormally separated, comprising the following steps:
  production by the crankshaft sensor of a signal having a "revolution" event,
  determination of the revolution out of two revolutions for a four-stroke engine, a crankshaft performing exactly two revolutions per cycle of the engine, in order to complete the determination of the angular position of the engine, characterized in that for each "no tooth" event possibly produced, a change in direction of rotation of the engine is suspected, and an analysis step is carried out comprising:
    if in an inverse window, at a distance from the current "no tooth" event equal to the distance between the preceding "revolution" event and the current "no tooth" event, toleranced by +/− a tolerance of teeth, with preferably a tolerance equal to 2 teeth, a new "no tooth" event is produced, the change in direction of rotation is confirmed, and
    if in the inverse window no "no tooth" event is produced, the change in direction of rotation is invalidated, each of the conditions being considered in its order of occurrence.

According to another feature, the analysis step additionally comprises:
  if in a direct window, at a distance from the preceding "revolution" event equal to a crankshaft wheel revolution, toleranced by +/− a tolerance of teeth, with preferably a tolerance equal to 2 teeth, a new "revolution" event is produced, the change in direction of rotation is invalidated, and
  if in the direct window no "revolution" event is produced, the change in direction of rotation is confirmed, each of the conditions being considered in its order of occurrence.

According to another feature, a "no tooth" event can be produced only outside a direct window distant from a preceding "revolution" event by a "tooth" event number equal to said large number of teeth and toleranced by +/− a tolerance of teeth, with preferably a tolerance equal to 2 teeth.

According to another feature, a "revolution" event can be produced only in a direct window distant from a preceding "revolution" event by a "tooth" event number equal to said large number of teeth and toleranced by +/− a tolerance of teeth, with preferably a tolerance equal to 2 teeth.

According to another feature, the crankshaft toothed wheel is regularly angularly divided into 60 and comprises a large number of teeth equal to 58, and 2 consecutive missing teeth forming the revolution marker.

BRIEF DESCRIPTION OF THE DRAWINGS

Other features, details and advantages of an aspect of the invention will become more clearly apparent from the detailed description provided below by way of indication with reference to the drawings, in which:

FIGS. 2 and 3 show two use cases having a "no tooth" event situated in a first half of a revolution, FIGS. 4 and 5 show two use cases having a "no tooth" event situated in a second half of a revolution, FIG. 6 shows another use case having a second "no tooth" event.

Figure 1:
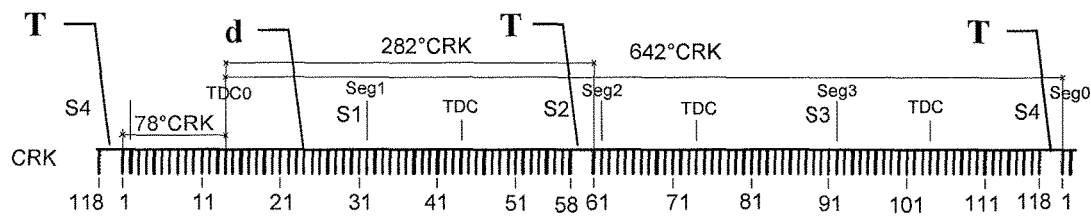
FIG. 1 shows, on a timing diagram, a crankshaft signal over one complete engine cycle.

The crankshaft is the output shaft of an engine. It rotates driven directly by the connecting rod or rods and performs two revolutions per engine cycle. A camshaft, controlling the valves, is a shaft driven indirectly, via a distribution transmission, by the crankshaft, and performs one revolution per engine cycle. An engine cycle is then conventionally labeled as a function of the angle of orientation of the crankshaft over 720°.

DETAILED DESCRIPTION OF THE PREFERRED EMBODIMENTS

A crankshaft or CRK sensor makes it possible to know the angular position of the crankshaft. To this end, a crankshaft sensor comprises a crankshaft toothed wheel and a crankshaft detector arranged facing said crankshaft toothed wheel and able to detect a presence/absence of material and thus to detect a tooth or a slot. The crankshaft toothed wheel is joined to the crankshaft so as to rotate therewith, whereas the crankshaft detector is fixed. The crankshaft toothed wheel comprises a large number N of regular teeth and a single revolution marker that makes it possible to determine a particular angular position upon each revolution in an absolute fashion. The crankshaft toothed wheel is angularly divided equally into a large number of regular teeth, thus making it possible to accurately ascertain the angular position of the crankshaft, by counting the teeth, in relation to the revolution marker. Said revolution marker is generally associated with a particular position of the engine, such as conventionally the top dead center of a cylinder, for example the first cylinder.

The crankshaft sensor arranged facing the crankshaft toothed wheel is able to detect a presence of material facing a tooth and an absence of material facing a recess or slot. The crankshaft detector or a processing unit, which is associated and merged with the crankshaft detector for the needs of the present case, is able to produce a "tooth" event d for each of the N teeth of the crankshaft toothed wheel. Such a "tooth" event d typically corresponding to an edge for each tooth. Given the large number N of teeth present on the crankshaft toothed wheel, a single edge per tooth, out of the rising edge or the falling edge, may be adopted. In a conventional manner, the falling edge is used to form the "tooth" event d. This hypothesis is adopted for the remainder of the description.

The crankshaft detector is additionally able to produce a "revolution" event T when it detects the revolution marker.

The profile of the teeth of the crankshaft toothed wheel is symmetrical. It therefore does not make it possible to ascertain the direction of rotation of the crankshaft toothed wheel and of the crankshaft. The direction of rotation of the engine, and therefore of the crankshaft, is assumed to be normal, initially on starting, when the synchronization method is implemented. However, this direction of rotation may be inverted in certain circumstances, causing the engine to rotate in the inverse direction.

To simplify the description, it is assumed that the "tooth" events d are produced on falling edges. An identical reasoning could be applied for rising edges.

At the moment of the inversion of the direction of rotation, the crankshaft detector sees a last falling edge, since the "tooth" events d are falling edges, then a last recess where the stopping of the rotation occurs according to a first hypothesis. Alternatively, according to a second hypothesis, the rotation continues and the crankshaft detector sees another last rising edge, hence ignored since rising, preceding a last tooth where the stopping of the rotation occurs.

When the crankshaft toothed wheel sets off in the other direction, according to the first hypothesis the crankshaft detector sees, in the other direction, the start of the last recess. It then sees a rising edge, hence ignored since rising, which is other than the last falling edge seen in the other direction. It then sees a tooth and a falling edge, which forms a new "tooth" event d.

When the crankshaft toothed wheel sets off in the other direction, according to the second hypothesis the crankshaft detector sees, in the other direction, the start of the last tooth. It then sees a falling edge, which forms a new "tooth" event d. This falling edge is other than the last rising, edge seen in the other direction.

The result of this is that the last rising edge seen before the change of direction and the first following falling edge seen after the change of direction produce "tooth" events d which are most often closer to or more distant from one another than two "tooth" events d produced by two successive teeth seen in one and the same direction of rotation. Such a variation in the distance/periodicity between two successive "tooth" events d during a change of direction, by comparison with a previous distance/periodicity in one and the same direction of rotation, can be identified by the crankshaft detector which consequently produces a "no tooth" event DD or a "revolution" event.

Certain processing algorithms make it possible to avoid a confusion between a "revolution" event T and a "no tooth" event DD, mainly on the basis of the periodicity of the "revolution" events T.

According to one common but non-mandatory embodiment, the crankshaft toothed wheel is angularly divided equally into 60 regular teeth. Two consecutive teeth are removed so as to form the revolution marker. This leads to a signal CRK as seen by the crankshaft detector, as illustrated in FIG. 1. The signal CRK periodically has a "revolution" event T at the 2 missing teeth and, more precisely, at the 1st tooth following the two missing teeth, followed by 58 "tooth" events d, as long as the crankshaft is rotating in one and the same direction.

According to certain implementations, a "revolution" event coincides with a first "tooth" event and thus occults the latter. Thus, the following "tooth" events theoretically numbering 58 are 57 in number in this particular practical case.

Following detection of a "revolution" event T1, a new "revolution" event T2 is expected, in a direct window F2, one revolution of the crankshaft toothed wheel later. It is advantageously verified that this new "revolution" event T is situated in a window of N=58+/− n=2 "tooth" events d (including, where appropriate, the "tooth" event coinciding with the "revolution" event) after the preceding "revolution" event T1.

In order to avoid confusing a "revolution" event T with a "no tooth" event DD, a similar window of N=58+/− n=2 "tooth" events d is employed after each "revolution" event T, in which it is not possible to produce a "no tooth" event DD even if a new "revolution" event T can be produced only in this window of N=58+/− n=2 "tooth" events d after each preceding "revolution" event T.

As soon as a first "revolution" event T is detected, the angular position of the crankshaft toothed wheel, and therefore of the crankshaft, is known with an inverse precision of the total number of teeth N+2, including the two missing teeth, of the crankshaft toothed wheel, that is to say all the more precise as the number N of effective teeth or the total number N+2 of teeth is large. The crankshaft is synchronized. It is therefore advantageous for the crankshaft toothed wheel to comprise a large number N of teeth.

However, for a four-stroke engine, a crankshaft performs exactly two revolutions per engine cycle. Thus, the knowledge of the angular position of the revolution marker and the synchronization of the crankshaft are insufficient to indicate the angular position of the engine, since it is known with an uncertainty of one revolution out of two.

The determination of the revolution out of two, in order to complete the determination of the angular position of the engine, can be carried out by any means. This point is not the subject of an aspect of the invention. According to one embodiment, it is possible to use a camshaft sensor, for example according to the method as described in patent application FR 1560189 of 26 Oct. 2015 (published as FR 3042860) by the same applicant, incorporated by reference herein.

It is always assumed that the engine initially rotates in the normal direction.

Outside the "tooth" events, the first event produced by the crankshaft sensor is always a "revolution" event T, denoted T1.

Specifically, any anomaly, whether it concerns a revolution marker, a sudden acceleration, or a change in direction of rotation, will be detected in the same way. Thus, according to one possible embodiment, an anomaly is detected, for example, by means of a comparison of the successive tooth distances. This can, for example, be implemented by a formula: $Td(i)/(Td(i-1)>K$, where Td (i) is the duration of the ith tooth between the front of a preceding "tooth" event i−1 and the front of a following "tooth" event i, and K is a detection threshold, typically equal to 1.5. In the nominal case of normally spaced teeth, the ratio is substantially close to 1. If inequality is verified, with a ratio above K, an anomaly is detected. This test is a possible means for determining that two successive "tooth" events d are abnormally separated.

The very first anomaly thus detected is considered to be a revolution marker. This hypothesis may, where appropriate, be verified by means of a stricter formula than the preceding one. If a revolution marker is confirmed, a first "revolution" event T, denoted T1, is produced.

Once this first "revolution" event T1 is produced, there is periodically determined a direct window F1, F2 in which a new "revolution" event is expected. This direct window F1, F2 is determined to be distant from the first "revolution" event T1 by a crankshaft wheel revolution, that is to say by the tooth number N of the crankshaft wheel assigned a tolerance of +/− n teeth. Thus, any new anomaly produces a new "revolution" event T2 if it is situated in such a direct window F1, F2 or a "no tooth" event if it is situated outside such a direct window F1, F2.

Such a method of synchronizing/determining the angular position of an engine can, in a prejudicial manner, be deceived, for example, if the engine changes direction of rotation and starts to rotate oppositely. Now, if an engine is said to be synchronized, whereas it rotates oppositely, a damaging operation, such as fuel injection, can be commanded and can lead to damaging effects for the engine.

An inversion or change in direction of rotation of the engine is necessarily accompanied by a "no tooth" event DD which is assumed to be always detectable by the crankshaft sensor. However, a "no tooth" event DD can also be produced by other causes. Thus, it is appropriate to know the difference in order to confirm or invalidate a change in direction of rotation of the engine.

In order to avoid such a problem, an aspect of the invention proposes that a "no tooth" event DD1, DD2 be considered as a suspicion of change in direction of rotation. Only one suspicion is taken into account since, given the mode of production of a "no tooth" event DD1, DD2, such an event can also be produced in the event of sudden deceleration of the engine, in the event of an engine sputter or else in the event of a very rapid back-and-forth change in direction of rotation, or double change in direction. In any case, the engine ultimately rotates in the normal direction and does not risk posing a problem for synchronization. By contrast, a revolution marker, seen outside a direct window F1, F2, typically owing to an inversion of direction of rotation, produces a "no tooth" event and not a "revolution" event.

Such a suspicion of change in direction of rotation, triggered by a "no tooth" event DD1, also called current "no tooth", must then be confirmed or invalidated, advantageously as quickly as possible.

This is carried out by an analysis of the conditions or events occurring subsequently to the current "no tooth" event DD1, having raised the suspicion of change in direction of rotation.

Two cases may present themselves: the current "no tooth" event DD1 is produced in the first half of a crankshaft wheel revolution, that is to say in the first half of the interval separating the preceding "revolution" event T1 from a following "revolution" event T2, or by contrast the current "no tooth" event DD1 is produced in the second half of the crankshaft wheel revolution, that is to say in the second half of the interval separating the preceding "revolution" event T1 from a following "revolution" event T2.

Figure 2:
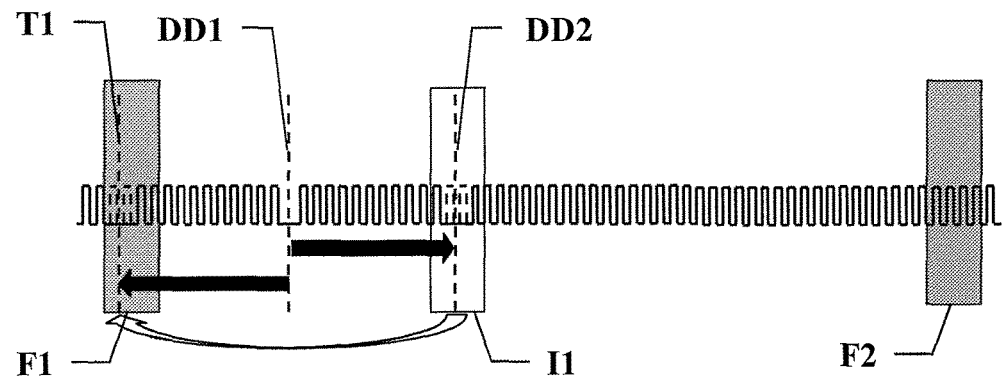
FIGS. 2-6 show, in a time diagram, a crankshaft signal according to different use cases, as follows.
Figure 3:
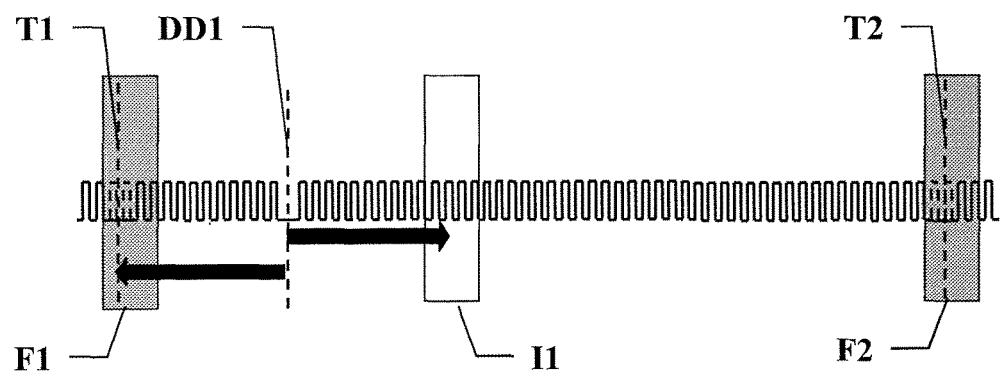

The first case is illustrated in FIGS. 2 and 3. Since the current "no tooth" event DD1 is produced in the first half of a crankshaft wheel revolution, the closest event (outside a "tooth" event d) which can be produced subsequently is a new "no tooth" event DD2.

If as illustrated in FIG. 2, this new "no tooth" event DD2 is situated in an inverse window I1, in that the distance between the preceding "revolution" event T1 and the current "no tooth" event DD1 is substantially equal to the distance between the current "no tooth" event DD1 and the new "no tooth" event DD2, these distances being represented by black arrows, the new "no tooth" event DD2 can be interpreted as an aliasing of the revolution marker previously having produced the preceding "revolution" event T1, and now seen (again) in the other direction. It then appears that the engine has probably changed direction of rotation and that the current "no tooth" DD1 indeed corresponded to a change in direction of rotation. Thus, if this condition of the presence of a "no tooth" event DD2 which is equidistant, or in an inverse window I1, is verified, the change in direction of rotation is confirmed.

It should be noted that this confirmation of change in direction of rotation can be subsequently confirmed in that, since the engine is supposed to have changed direction of rotation, no "revolution" event should be produced in the next direct window F2.

Figure 6:
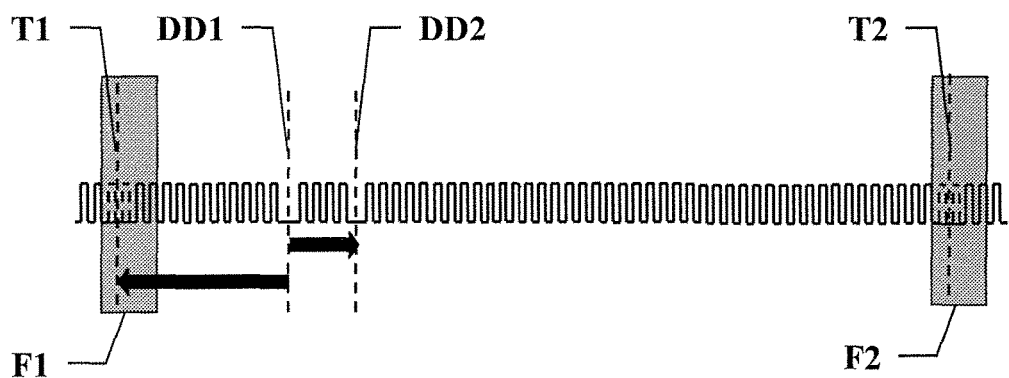

If, by contrast, as illustrated in FIG. 3, no new "no tooth" event is produced in the inverse window I1, situated at a distance from the current "no tooth" event DD1 substantially equal to the distance between the preceding "revolution" event T1 and the current "no tooth" event DD1, this condition can be interpreted as an absence of aliasing of the revolution marker. This condition includes the case of a new "no tooth" event DD2 produced but not situated in the inverse window I1, as illustrated in FIG. 6. It then appears that the engine has probably not changed direction of rotation and that the current "no tooth" DD1 corresponded to another cause, such as a sudden acceleration, and not a change in direction of rotation. Thus, if this condition of absence of a "no tooth" event DD in the inverse window I1 is verified, the change in direction of rotation is invalidated.

It should be noted that this invalidation of change in direction of rotation can be subsequently confirmed in that, since the engine is not supposed to have changed direction of rotation, a new "revolution" event T2 should be produced in the next window F2.

Figure 4:
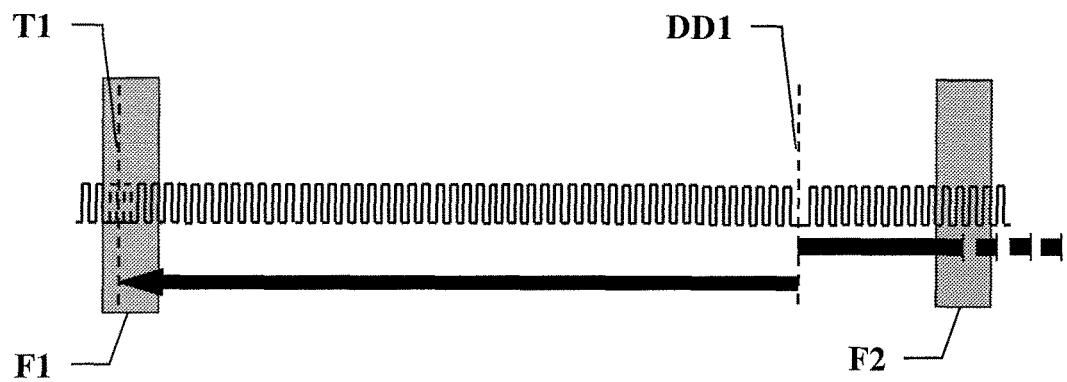
Figure 5:
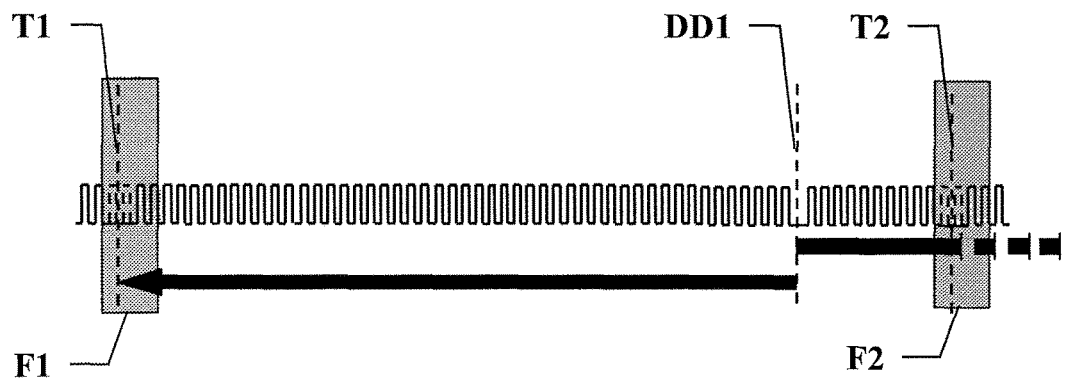

The second case is illustrated in FIGS. 4 and 5. Since the current "no tooth" event DD1 is produced in the second half of a crankshaft wheel revolution, the closest event (outside a "tooth" event d) which can be produced subsequently is a new "revolution" event T2. Specifically, any aliasing of the preceding "revolution" event T1 could be produced only after the direct window F2.

If, as illustrated in FIG. 4, no new "revolution" event is produced in a direct window F2, distant from the preceding "revolution" event T1 by a crankshaft wheel revolution, that is to say substantially N "tooth" events d, this can be interpreted as the consequence of a change in direction of rotation of the engine. Thus, the current "no tooth" DD1 probably indeed corresponded to a change in direction of rotation. Thus, if this condition of absence of "revolution" event in a direct window F2 is verified, the change in direction of rotation is confirmed.

It should be noted that this confirmation of change in direction of rotation can be subsequently confirmed in that, since the engine is supposed to have changed direction of rotation, an aliasing of the preceding "revolution" event T1 should produce a new equidistant "no tooth" event DD2, that is to say at a distance from the current "no tooth" event DD1 substantially equal to the distance between the preceding "revolution" event T1 and the current "no tooth" event DD1.

If, by contrast, as illustrated in FIG. 5, a new "revolution" event T2 is produced in the direct window F2, situated at a distance from the preceding "revolution" event T1 substantially equal to a crankshaft wheel revolution, this condition can be interpreted as a confirmation that the engine still rotates in the normal direction. This condition includes the case of a new "no tooth" event DD2 produced but not situated in the window F2, as illustrated in FIG. 6. It then appears that the engine has, probably not changed direction of rotation and that the current "no tooth" DD1 corresponded to another cause, such as a sudden acceleration and not a change in direction of rotation. Thus, if this condition of the presence of a "revolution" event in the direct window F2 is verified, the change in direction of rotation is invalidated.

It should be noted that this invalidation of change in direction of rotation can be subsequently confirmed in that, since the engine is not supposed to have changed direction of rotation, a new "no tooth" event DD2 should not be produced in a next inverse window I1, situated at a distance from the current "no tooth" event DD1 substantially equal to the distance between the preceding "revolution" event T1 and the current "no tooth" event DD1, confirming an absence of aliasing of the revolution marker.

It should be noted that the case where the "no tooth" event is situated exactly in the center of the revolution, that is to say at equal distance from the preceding "revolution" event T1 and from the new "revolution" event T2, cannot be resolved by the method. Specifically, in this case, the direct window F2 coincides with the inverse window I1. Thus, in this particular case, it is not possible to determine if an anomaly is a new "revolution" T2 (or "no tooth") event or a "revolution" event caused by an aliasing of the revolution marker of the preceding "revolution" event T1, the two phenomena being superimposed.

For this particular case, it is appropriate to employ another means for detecting a change in direction of rotation, such as that described in the aforementioned patent application. This other detection means can be used alternatively or additionally to the present invention.

The previously described analysis has not to determine if a current "no tooth" event DD1 is in the first half or in the second half of the revolution. It is sufficient to apply the analysis by testing the following four conditions: presence or absence of a "revolution" event in the direct window F2, presence or absence of a "no tooth" event in the inverse window I1, and by reacting as a function of the condition which occurs first.

The previously described analysis is advantageously applied to any "no tooth" event which can in turn be considered as a suspicion of change in direction of rotation. Thus, each successive "no tooth" event is advantageously considered as a current "no tooth" to which the preceding analysis is applied.

Thus, as illustrated in FIG. 6, a first "no tooth" DD1 is produced. This "no tooth" DD1 is considered as the current "no tooth" and the analysis step is applied thereto by testing, where appropriate, the presence of another "no tooth", such as, for example, the "no tooth" DD2. Next, a second "no tooth" DD2 is produced. This "no tooth" DD2 is in turn considered as the current "no tooth", potential indicator of a change in direction of rotation, and the analysis step is applied thereto for the purpose of confirmation or invalidation. The procedure is thus for each successively produced "no tooth" event.

As described above, the first detected anomaly is considered to be a "revolution" event. Next, a periodic direct window F1, F2, distant from the preceding "revolution" event by one revolution, that is to say by said large number N of teeth, and toleranced by +/− a tolerance n of teeth, that is to say having an extent of 2n teeth, is determined. An anomaly situated in such a window produces a "revolution" event. An anomaly situated outside such a window produces a "no tooth" event. The tolerance n is preferably equal to 2 teeth.

In all the tests previously described, and mainly in the analysis step, where the term "substantially equal" is indicated, this expression means that the equality test is toleranced by +/− a tolerance p of teeth. The tolerance p is preferably equal to 2 teeth.

The invention claimed is:

1. A method for determining an angular position of an engine by a crankshaft sensor comprising a crankshaft detector facing a crankshaft toothed wheel comprising a large number of regular teeth and a revolution marker, the crankshaft detector being able to produce a signal having a "tooth" event corresponding to an edge for each of the teeth, a "revolution" event for the revolution marker, and a "no tooth" event when two successive "tooth" events are abnormally separated, the method comprising:

producing, by the crankshaft sensor, a signal having the "revolution" event, determination of the revolution event out of two revolutions for a four-stroke engine, a crankshaft performing exactly two revolutions per cycle of the engine, in order to complete the determination of the angular position of the engine, wherein for each of the "no tooth" events possibly produced, a change in direction of rotation of the engine is suspected, and an analysis step is carried out comprising:

a) if in an inverse window, at a distance from a current "no tooth" event equal to a distance between the preceding "revolution" event and the current "no tooth" event, toleranced by +/−a tolerance of the teeth, a new "no tooth" event is produced, the change in direction of rotation is confirmed, and b) if in the inverse window no "no tooth" event is produced, the change in direction of rotation is invalidated.

2. The method as claimed in claim 1, in which the analysis step additionally comprises:

c) if in a direct window, at a distance from a preceding "revolution" event equal to a crankshaft wheel revolution, 2olerance by +/−the tolerance of teeth, a new "revolution" event is produced, the change in direction of rotation is invalidated, and d) if in the direct window no new "revolution" event is produced, the change in direction of rotation is confirmed.

3. The method as claimed in claim 1, wherein the "no tooth" event can be produced only outside a direct window at a distance s from a preceding "revolution" event by a "tooth" event number equal to the large number of teeth corresponding to a rotation of the crankshaft toothed wheel and tolerance by +/−the tolerance of teeth, wherein the tolerance is equal to 2 teeth.

4. The method as claimed in claim 1, wherein the "revolution" event can be produced only in a direct window at a distance from a preceding "revolution" event by a "tooth" event number equal to the large number of teeth corresponding to a rotation of the crankshaft toothed wheel and tolerance by +/−the tolerance of teeth, wherein the tolerance is equal to 2 teeth.

5. The method as claimed in claim 1, wherein the crankshaft toothed wheel is regularly angularly divided into 60 and the large number of teeth is equal to 58, and 2 consecutive missing teeth form the revolution marker.

6. The method as claimed in claim 1, wherein the tolerance is equal to 2 teeth.

7. The method as claimed in claim 2, wherein the "no tooth" event can be produced only outside a direct window distant from the preceding "revolution" event by a "tooth" event number equal to the large number of teeth and tolerance by +/−the tolerance of teeth, wherein the tolerance is equal to 2 teeth.

8. The method as claimed in claim 1, wherein each of conditions a) and b) are considered in order of occurrence.

9. The method as claimed in claim 2, wherein each of conditions c) and d) are considered in order of occurrence.

* * * * *

UNITED STATES PATENT AND TRADEMARK OFFICE
CERTIFICATE OF CORRECTION

PATENT NO. : 10,428,752 B2
APPLICATION NO. : 15/778441
DATED : October 1, 2019
INVENTOR(S) : Christophe Mazenc and Pierre Zouboff Page 1 of 1

It is certified that error appears in the above-identified patent and that said Letters Patent is hereby corrected as shown below:

In the Claims

Column 9, Claim 2, at Line 24, "2olerance by +/-the tolerance of teeth," should read – toleranced by +/- the tolerance of teeth, –.

Column 10, Claim 3, at Line 1, "at a distance s from a preceding "revolution" event by a" should read – at a distance from a preceding "revolution" event by a –.

Column 10, Claim 3, at Line 4, "tolerance by +/-the tolerance of teeth," should read – toleranced by +/- the tolerance of teeth, –.

Column 10, Claim 4, at Line 11, "tolerance by +/-the tolerance of teeth," should read – toleranced by +/- the tolerance of teeth, –.

Column 10, Claim 7, at Line 24, "tolerance by +/-the tolerance of teeth," should read – toleranced by +/- the tolerance of teeth, –.

Signed and Sealed this
Nineteenth Day of November, 2019

Andrei Iancu
*Director of the United States Patent and Trademark Office*